United States Patent
Dunleavy et al.

(10) Patent No.: US 8,695,195 B2
(45) Date of Patent: Apr. 15, 2014

(54) PROCESS FOR MANUFACTURING A METAL PART REINFORCED WITH CERAMIC FIBRES

(75) Inventors: Patrick Dunleavy, Palaiseau (FR); Richard Masson, Buc (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 454 days.

(21) Appl. No.: 13/002,514

(22) PCT Filed: Jul. 3, 2009

(86) PCT No.: PCT/FR2009/051307
§ 371 (c)(1),
(2), (4) Date: Jan. 4, 2011

(87) PCT Pub. No.: WO2010/001069
PCT Pub. Date: Jan. 7, 2010

(65) Prior Publication Data
US 2011/0107579 A1    May 12, 2011

(30) Foreign Application Priority Data

Jul. 4, 2008 (FR) ...................................... 08 54590

(51) Int. Cl.
*B23P 17/00* (2006.01)
*B23P 17/04* (2006.01)
*B23P 11/00* (2006.01)
*B21K 25/00* (2006.01)
*B23K 31/02* (2006.01)
*B21D 39/00* (2006.01)
*B23K 20/00* (2006.01)
*B23K 1/19* (2006.01)
*B23K 20/22* (2006.01)

(52) U.S. Cl.
USPC ............. 29/419.1; 29/428; 29/592; 29/889.2; 228/122.1; 228/124.6; 228/164; 228/165; 228/170; 228/172; 228/193; 228/194; 228/195; 228/262.71; 228/262.72

(58) Field of Classification Search
USPC ........... 29/419.1, 428, 592, 889.2; 228/122.1, 228/124.6, 164, 165, 170, 172, 193, 194, 228/195, 262.71, 262.72
See application file for complete search history.

(56) References Cited

U.S. PATENT DOCUMENTS 4,886,108 A * 12/1989 Utsunomiya et al. ......... 164/461
4,900,599 A *  2/1990 Doble .......................... 428/64.1
(Continued)

FOREIGN PATENT DOCUMENTS

EP         1 726 677         11/2006

OTHER PUBLICATIONS

U.S. Appl. No. 12/670,767, filed Jul. 7, 2010, Dunleavy, et al.

(Continued)

*Primary Examiner* — Essama Omgba
*Assistant Examiner* — Darrell C Ford
(74) *Attorney, Agent, or Firm* — Oblon, Spivak, McClelland, Maier & Neustadt, L.L.P.

(57) ABSTRACT

A process for manufacturing a metal part reinforced with ceramic fibers including machining at least one housing for an insert in a metal body having an upper face. At least one insert formed from ceramic fibers in a metal matrix is placed in the housing. The insert is covered with a cover. A vacuum is created in the interstitial space around the insert and the interstitial space is hermetically sealed under vacuum. The assembly, namely the metal body with the cover, is treated by hot isostatic pressure. The treated assembly is machined in order to obtain the part. The cover includes an element covering the insert in the slot and projecting from the upper face, and a sheet covering the upper face with said element. In particular, the insert is straight and the housing for the insert in the metal body forms a straight slot.

9 Claims, 2 Drawing Sheets

(56) References Cited

U.S. PATENT DOCUMENTS

| | | | | |
|---|---|---|---|---|
| 5,264,011 | A | * | 11/1993 | Brown et al. .................... 51/309 |
| 5,305,520 | A | * | 4/1994 | Doorbar et al. ............ 29/889.21 |
| 5,431,984 | A | * | 7/1995 | Keck et al. .................... 428/175 |
| 6,918,530 | B2 | * | 7/2005 | Shinkai et al. ............. 228/122.1 |
| 7,516,548 | B2 | * | 4/2009 | Twigg ........................ 29/889.71 |
| 7,726,023 | B2 | * | 6/2010 | Pursell ....................... 29/889.23 |
| 8,418,343 | B2 | * | 4/2013 | Dunleavy et al. ............... 29/447 |
| 8,458,886 | B2 | * | 6/2013 | Masson et al. ................ 29/527.1 |
| 2007/0020134 | A1 | * | 1/2007 | Pursell .............................. 419/8 |
| 2007/0051455 | A1 | * | 3/2007 | Franchet et al. ............. 156/169 |
| 2010/0291339 | A1 | | 11/2010 | Dunleavy et al. | 
| 2011/0005061 | A1 | | 1/2011 | Masson et al. |
| 2011/0027119 | A1 | | 2/2011 | Masson |
| 2011/0053872 | A1 | | 3/2011 | Zhu |
| 2011/0086199 | A1 | * | 4/2011 | Duqueine et al. ............ 428/112 |

OTHER PUBLICATIONS

U.S. Appl. No. 13/002,580, filed Jan. 4, 2011, Dunleavy et al.
U.S. Appl. No. 12/997,785, filed Dec. 13, 2010, Dunleavy et al.
International Search Report issued Jan. 27, 2010 in PCT/FR09/051307 filed Jul. 3, 2009.
U.S. Appl. No. 13/378,815, filed Dec. 16, 2011, Dunleavy et al.

\* cited by examiner

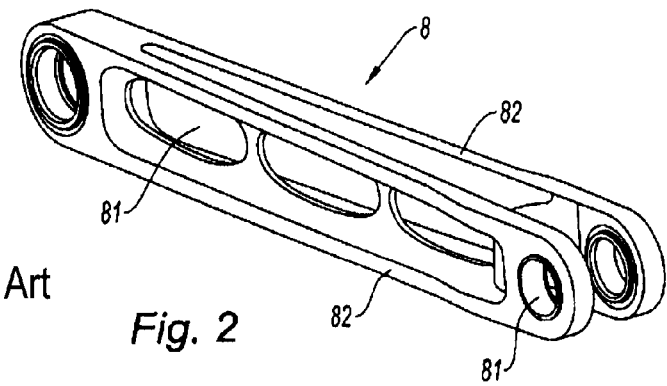
Related Art
Fig. 2
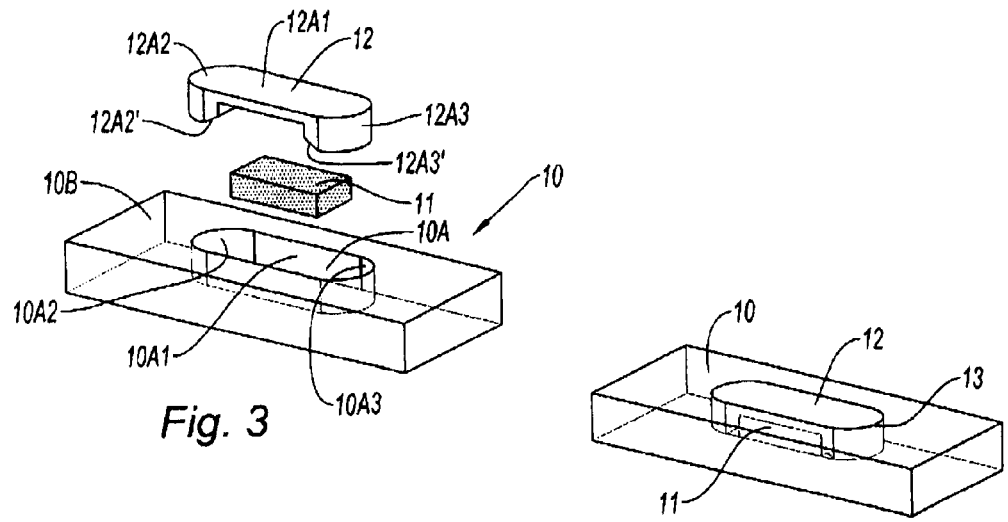
Fig. 3
Fig. 4
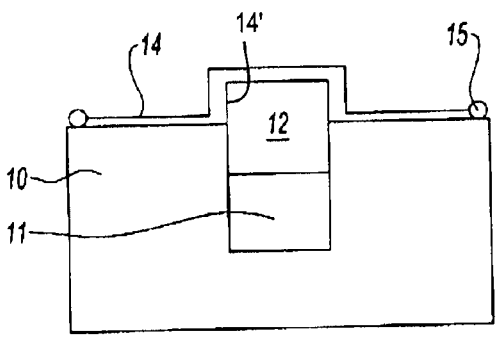
Fig. 5

PROCESS FOR MANUFACTURING A METAL PART REINFORCED WITH CERAMIC FIBRES

TECHNICAL FIELD

The present invention relates to the manufacture of metal parts having internal reinforcements formed from ceramic fibres and obtained by the incorporation of a fibrous insert into a metal matrix.

BACKGROUND

For the purpose of reducing the weight of metal parts while giving them greater strength, especially in tension and/or in compression, it is known to incorporate ceramic fibres thereinto, in a relevant manner. For example, these are silicon carbide (SiC) fibres which have a tensile strength and a compressive strength that are substantially greater than that of a metal such as titanium.

The manufacture of these parts involves the prior formation of inserts from metal-coated ceramic filaments. They are also referred to as CMM fibres or coated filaments. The metal gives, in particular, the elasticity and flexibility necessary for handling them.

A known process for manufacturing such reinforced parts comprises the production of a winding of coated filaments around a mandrel. The winding is then introduced into a main metal body or container in which a slot forming the housing for the insert has been machined beforehand. The depth of the slot is greater than the height of the winding. A cover is placed on the container and welded to its periphery. The cover has a tenon having a shape complementary to that of the slot, and its height is adapted to that of the winding placed in the slot so as to fill the slot. Next, a hot isostatic pressing step is carried out, during which the cover is deformed and the winding is compressed by the tenon. The surface of the container along the edge of the slot is inclined so as to form a corner face for ensuring progressive deformation of the cover during the pressing phase.

The hot isostatic pressing technique consists in placing the part to be treated in an enclosure subjected to high pressure, of the order of 1000 bar, and also to high temperature, of the order of 1000° C., for a few hours.

During this treatment, the metal sheaths of the coated filaments are welded together and to the walls of the slot by diffusion welding, to form a dense assembly composed of a metal alloy within which the ceramic fibres extend. The part obtained is then machined to the desired shape.

The process serves for the manufacture of axisymmetric aeronautical parts, such as rotor disks or blisks (integrally bladed disks), but also non-axisymmetric parts such as connecting rods, shafts, actuator bodies and casings.

It is difficult to machine the slot in the main body, especially because of the small joining radii in the bottom of the slot between the surface of the bottom and the side walls. Such a small joining radius is necessary in order to house the insert with as small a clearance as possible, the insert having a rectangular cross section and being formed from small-radius filaments. The machining of the corresponding tenon in the cover is not easy either, because of the non-open-ended corners and because it is necessary to have a shape perfectly matching the slot.

The Applicant has developed a process for manufacturing parts of elongate shape that incorporate an insert with straight portions contributing to the transmission of the unidirectional tensile and/or compressive forces. This process is described in Patent Application FR 07/05453 of 26 Jul. 2007. The Applicant has also developed a process for manufacturing a straight insert. This process consists in producing an insert blank in the form of a winding, in compacting said blank in a container by hot isostatic pressing and then in machining the straight inserts in the compacted container. Such a process is described in patent application FR 07/05454 of 26 Jul. 2007.

However, when the parts to be produced are not axisymmetric, but are of oblong shape, of oval shape or else of a shape with straight portions, precise adjustment over long lengths is difficult to achieve. This is even more difficult for inserts formed from very rigid coated filaments, because of the ceramic fibres that require the formation of housings in which they fit perfectly. The cover must be assembled perfectly in the slot so as not to let the fibres escape.

Instead of manufacturing the insert separately and then transferring it to the slot of the main body, Patent FR 2 886 290 in the name of SNECMA proposes, according to one embodiment, to produce the winding directly on the main body. Instead of a slot, two shoulders are provided in the body. The first one has a bearing surface for the direct winding of a coated filament. This surface is parallel to the winding direction. When the winding has been completed, the slot is reconstituted by placing a part on the main body which has a shape complementary to that of a second shoulder forming a step in relation to the first shoulder. The cover with the tenon is then positioned on the insert that has just been wound and the assembly undergoes a compacting operation. The manufacturing problem is only partly solved by this solution, since the assembly operation remains complicated.

Patent Application FR 07/09171 in the name of the Applicant specifies that the housing for the insert in the metal body has the form of a notch of L-shaped cross section, the cover having an internal notch of L-shaped cross section and of shape complementary to that of the metal body with said insert. Furthermore, the cover is shaped on the outside so that the compressive forces are exerted perpendicular to the faces of the notch.

Thus, the current manufacturing techniques make it possible to create metal parts that include one or more reinforcements made of metal-matrix composites from a winding of coated fibres and a container—a body and a cover. These structures are very effective but have a high manufacturing cost. In particular, the machining of the main body of the container with its cover represents a large fraction of the total cost of the parts.

The Applicant was set the objective of improving the process for manufacturing parts of elongate shape for the purpose of simplifying the steps of the production operation and of reducing the costs.

SUMMARY

This objective is achieved according to the invention by a process for manufacturing a metal part reinforced with ceramic fibres, in which:
- at least one housing for an insert is machined in a metal body having an upper face;
- at least one insert formed from metal-coated ceramic fibres is placed in the housing;
- the insert is covered with a cover;
- a vacuum is created in the interstitial space around the insert and said space is hermetically sealed under vacuum;
- the assembly, namely the metal body with the cover, is treated by hot isostatic pressure; and said treated assembly is machined in order to obtain said part.

The process is characterized in that the cover comprises an element covering the insert in the slot and projecting from the upper face of the metal body, and a sheet covering the upper face with said element.

By dividing the cover into an element covering the insert in the slot and into a sheet separate from said element, the manufacture of this part is markedly simplified. The function of the element covering the insert in the slot is to act as a piston and that of the sheet is to allow the assembly to be hermetically sealed. Furthermore, by ensuring that said element is projecting, so as to compensate for the reduction in volume resulting from the densification of the insert during a hot isostatic pressing phase, the machining of the slot in the metal body is simplified.

The insert may be of elongate shape, for example of oblong annular shape, with one or more straight portions. Preferably, the insert is straight, for example it has the form of a straight block, and the housing for the insert in the metal body has a straight slot of corresponding shape. The element covering the insert in the slot is then block-shaped.

According to one embodiment in the case in which the insert has the form of a straight block, the slot has a first housing portion for the insert and at least one second portion extending the first portion, the block-shaped element comprising a central branch covering the insert and an extension of shape corresponding to the second portion of the slot. This element of the cover thus forms an easily producible metal block of simple geometry.

Preferably, the block-shaped element comprises a progressive deformation zone between the central branch and the extension. This progressive deformation zone prevents the cover from cracking during the pressing step.

The insert has a polygonal, especially rectangular, oval or circular, cross section.

Preferably, the insert is formed from metal-coated fibres assembled into a bundle, thereby reducing the preparatory operations.

Advantageously, the space surrounding the insert is hermetically sealed by a weld bead between the metal sheet and the metal body.

The solution of the invention has a particular advantage when fitting, for example, two inserts per face, of elongate, especially straight, shape which are placed along two parallel or non-parallel branches. According to the prior art, to obtain two longitudinal internal reinforcements, an insert of annular shape with two straight branches connected together by two circularly arcuate portions is produced beforehand. The housing is then machined according to the precise shape of the insert. Adjusting the shape of the housing to that of the insert has proved to be a very tricky and expensive operation. Thus, eliminating the fillets simplifies both the machining and the fitting, without sacrificing the strength of the final part since the fibres work essentially along their longitudinal direction in the central section of the part.

BRIEF DESCRIPTION OF THE DRAWINGS

One non-limiting embodiment of the invention will now be described in greater detail with reference to the appended drawings, in which:

FIG. 2 shows an example of a part obtained after machining a container incorporating inserts;

FIG. 3 shows in perspective a metal body with a machined slot in accordance with the invention and the fitting of the insert and the block forming a portion of the cover;

FIG. 4 shows in perspective, and as if transparent, the slotted metal body, the fibrous insert and the block of the cover in place;

FIG. 5 shows in cross section the block and the sheet together forming the cover on the insert and the metal body.

DETAILED DESCRIPTION

Figure 1:
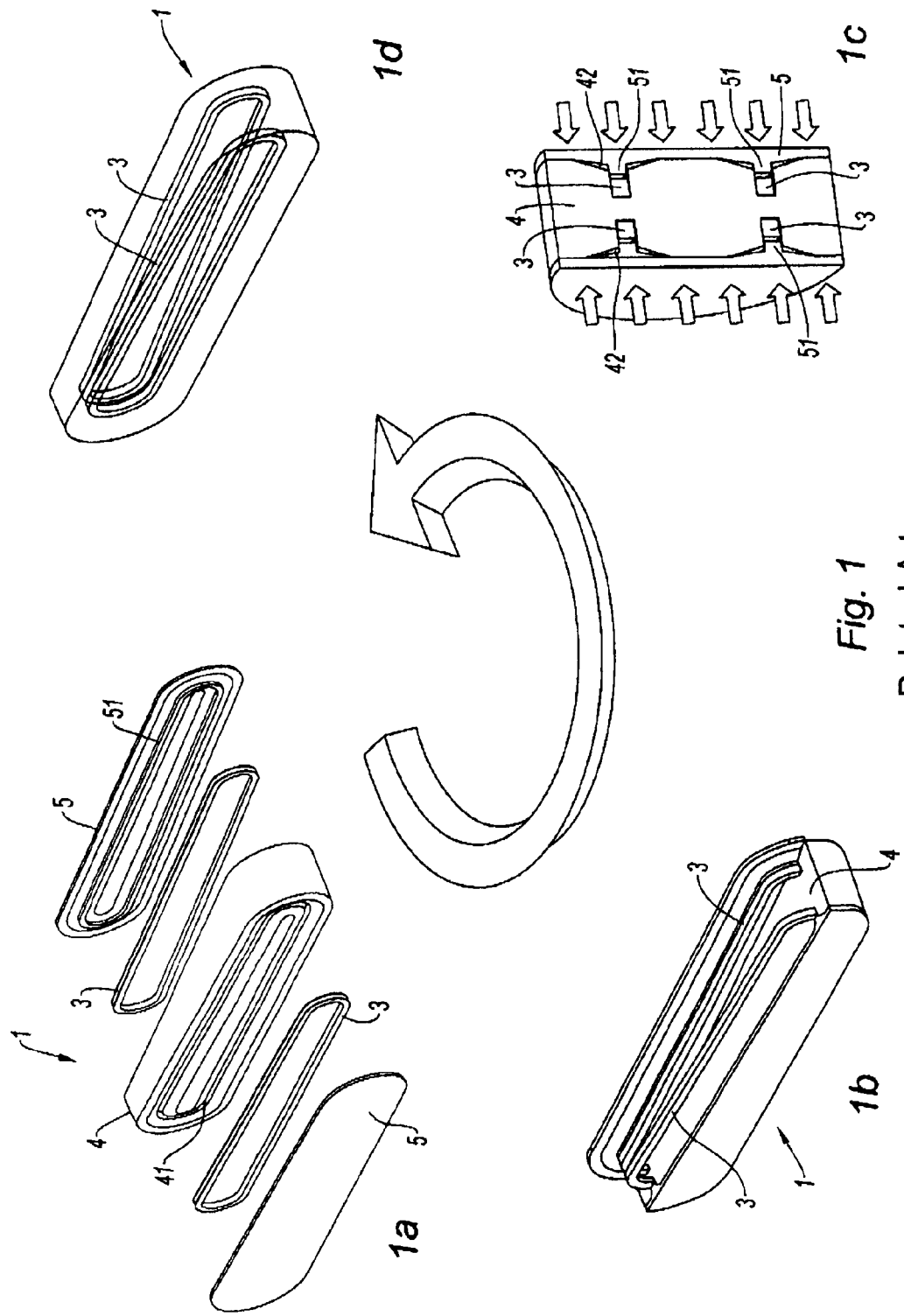
FIG. 1 shows the various steps 1a, 1b, 1c, 1d in the manufacture of an elongate part according to the known prior art of the present Applicant.

FIG. 1, taken from Patent Application FR 07/05453, shows a container 1 with a main body 4 of elongate shape, intended to form a connecting rod, for example for a landing gear. A slot 41 is machined in each of the two faces of the body 4. This slot serves to house an insert 3, which comprises two straight portions, which may or may not be parallel to each other, joined at the ends by a circularly arcuate portion. The inserts are of the type having ceramic fibres coated with a metal, such as titanium. The slots and the inserts have complementary shapes so that the insert is fitted into the slot with no clearance or with a minimal clearance. Two covers 5 are provided with a projecting portion, which forms a tenon 51, and cover the faces of the body 4. The tenon presses on the insert housed in the slot and fills the latter. The cover 5 is welded to the body 4, for example by electron beam welding, a vacuum being created inside the container.

This assembly has the function of preventing the fibres, which have a very small diameter, of around 0.25 mm, from being able to move or escape during the hot isostatic pressing and allowing compaction to take place. The container, shown in FIG. 1b, is partly removed so as to show the inserts. The container is then placed in an enclosure so as to undergo a hot isostatic pressing treatment. The cross section of the container in FIG. 1c shows that the edges 42 of the slot 41 are chamfered so as to leave a clearance with the portion of the cover 5 adjacent to the tenon 51. During the hot isostatic pressing operation, the pressure is exerted in the direction perpendicular to the surface of the cover, causing the covers to collapse. The heat and pressure, at around 1000° C. and 1000 bar, allow the metal to occupy the gaps between the coated filaments making up the insert. The volume of the insert decreases by about 23%. The tenon is thus moved downwards and the clearance on either side of the tenon is absorbed. At the end of the procedure, the metal has fused and the container compacted. The part is thus reinforced by the filaments embedded in the mass of metal. FIG. 1d shows the part blank obtained with two inserts visible as if the part were transparent. The blank is then machined so as to obtain the part 8 shown in FIG. 2. This part 8 has holes 81 between the branches 82. The ceramic fibres are incorporated into the branches 82, which ensure that the tensile and compressive forces are transmitted. The inserts used are of annular shape but, as described in Patent Application FR 07/05454, they may be formed from straight elements, in the form of bars. In the latter case, the straight elements are incorporated into the container after they have been compacted beforehand.

The solution of the invention enables such parts to be obtained more economically.

FIG. 3 shows a metal body 10 of elongate shape with, in relation to this figure, an upper face 10B. A straight slot 10A, the bottom of which is flat and the walls of which are perpendicular to the bottom, is machined. The joining surface between the bottom and the walls has a small radius of curvature so as to allow the insert to be fitted with as small as possible a clearance. The slot has a central portion 10A1 and two end portions 10A2 and 10A3 in the longitudinal extension thereof. The end parts are rounded. The slot serves as a housing for a straight block-shaped insert 11, formed from an assembly of coated ceramic fibres, the inserts having a length 1 smaller than or equal to the length of the central portion 10A1 of the slot. The insert forms a fibre bundle fitting into the central portion 10A1 of the slot. A block-shaped element 12 covers the insert 11 placed in the housing which constitutes the slot. The block-shaped element 12 has the same shape and the same dimensions, to within a clearance, enabling it to be fitted into the slot over the insert, when it is seen from above, as the slot 10A. It comprises a central portion 12A1 covering the insert and two end portions 12A2 and 12A3 in the longitudinal extension of the central portion on either side of the latter.

The thickness of the two end portions corresponds to the thickness of the central portion plus that of the insert placed in the slot and is slightly greater than the depth of the slot. The element 12 bears on the bottom of the slot via the two end portions 12A2 and 12A3. It may be seen that the end portions each have a corner face 12A2' and 12A3' leaving a space with the bottom of the slot on the insert side. The block-shaped element projects from the surface 10B. A metal sheet 14, the same metal as that of the metal body, especially a titanium alloy, is placed on the upper face of the metal body and welded on the periphery so as to provide a vacuum and hot isostatic pressing. The sheet is shaped so as to match the shape of the projecting element 12. It thus has a cavity 14', the shape of which corresponds to the projecting portion of the block-shaped element 12.

The manufacture of an example of a part according to the invention with an insert thus comprises the following steps:
a metal body 10, for example made of a titanium alloy, is prepared with at least one upper plane face;
at least one open straight slot 10A is machined on an upper or lower face 10B. This operation is relatively simple as only the depth and width of the slot need to be considered;
the insert 11 formed from an assembled bundle of coated straight fibres is placed in the slot; and
the block-shaped element 12 is put into place. The dimensions of the block-shaped element and of the slot are defined so that the block 12 can be placed easily in the slot.

After the block-shaped element 12 has been put into place over the insert which, as may be seen in FIG. 4, projects from the face 10B, and the sheet 14, which has been shaped with its cavity 14' so as to fit onto the block-shaped element, has been put into place, the assembly is evacuated.

The top of the block-shaped element 12 projects from the surface of the metal body. The sheet is welded right round the perimeter, forming a weld bead 15, so as to be vacuum tight and to maintain the vacuum inside the slot.

The container thus prepared is introduced into an enclosure for carrying out the hot isostatic pressing.

The assembly is heated and subjected to a high pressure so as to compact the container. The treatment results in a volume reduction and a densification of the insert. The central portion of the block-shaped element acts as a piston and descends into the slot. The transition zone formed by the corner faces 12A2' and 12A3' allows the element 12 to deform without the shear forces causing the block to crack.

The blank obtained is ready to be machined.

After machining, the part shown in FIG. 2 is for example obtained, comprising the positioning of the corresponding number of inserts.

This shows an embodiment of the invention with the machining of a slot, for housing a straight insert, which is closed longitudinally. However, it would not be outside the scope of the invention to produce one or more longitudinally open slots.

Furthermore, the insert may have any suitable shape for the application of internally reinforcing a metal part. The shape may be oblong, in the form of a ring with two straight portions joined by rounded portions. The element covering the insert in the slot has the same shape as the insert if it has to be fitted over the insert and plug the slot.

The process of the invention thus make it possible to produce any part of elongate shape incorporating in particular one or more straight inserts.

The invention claimed is:

1. A process for manufacturing a metal part reinforced with ceramic fibers, said process comprising:
   machining at least one housing in a metal body having an upper face;
   placing at least one insert formed from metal-coated ceramic fibers in the housing;
   covering the insert with a cover, including
      disposing an element directly on a surface of the insert so as to cover the insert and so that the element projects from the surface of the insert such that a portion of the element extends beyond the upper face of the metal body, and
      covering the upper face of the metal body and the element with a sheet;
   creating a vacuum in an interstitial space around the insert, said interstitial space being hermetically sealed;
   treating the metal body with the cover by hot isostatic pressure to form an assembly; and
   machining said treated assembly in order to obtain said part,
   wherein the sheet includes a cavity having a shape corresponding to a shape of the portion of the element that extends beyond the upper face of the metal body.

2. The process according to claim 1, wherein the insert is of elongate shape, and the housing for the insert in the metal body has a slot of corresponding shape.

3. The process according to claim 2, wherein the insert is of straight shape and the element covering the insert is block-shaped.

4. The process according to claim 3, wherein the slot has a first housing portion for the insert and at least one second portion extending from the first housing portion, and
   wherein the block-shaped element includes
      a central branch covering the insert, and
      an extension shaped to correspond to a shape of the second portion of the slot.

5. The process according to claim 4, wherein the block-shaped element further includes a progressive deformation zone between the central branch and the extension.

6. The process according to claim 1, wherein the insert has a cross section that is one of polygonal, oval, and circular.

7. The process according to claim 1, wherein the insert is formed from metal-coated fibers assembled into a bundle.

8. The process according to claim 1, wherein said interstitial space is hermetically sealed by a weld bead between the metal sheet and the metal body.

9. The process according to claim 1, wherein at least a second insert is placed in the metal body.

* * * * *